United States Patent Office 3,166,480
Patented Jan. 19, 1965

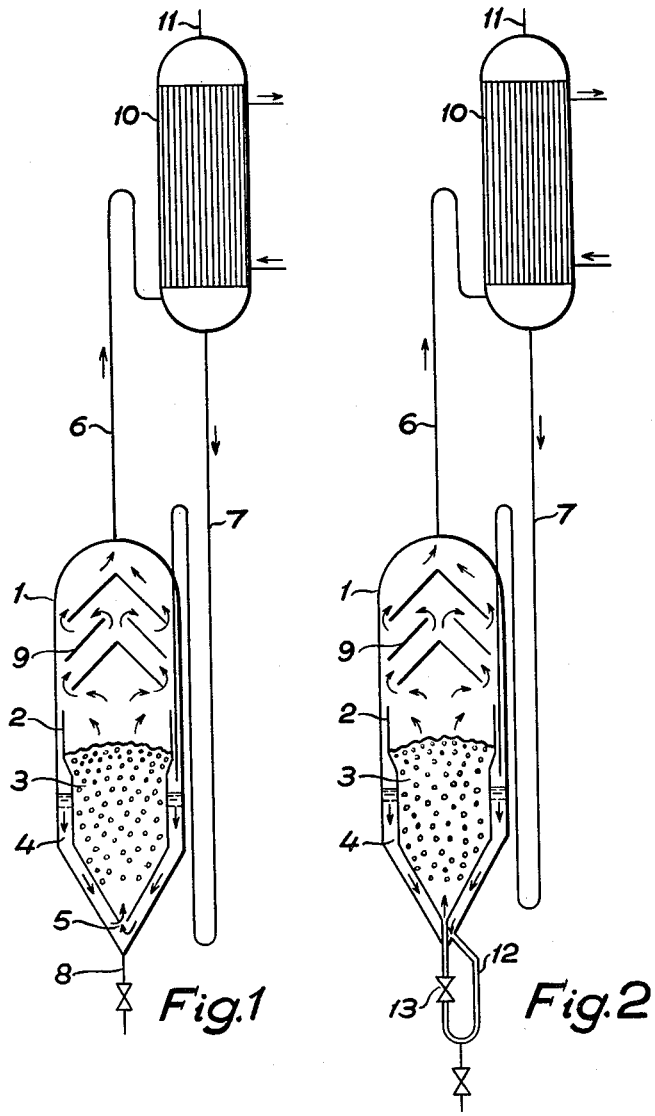

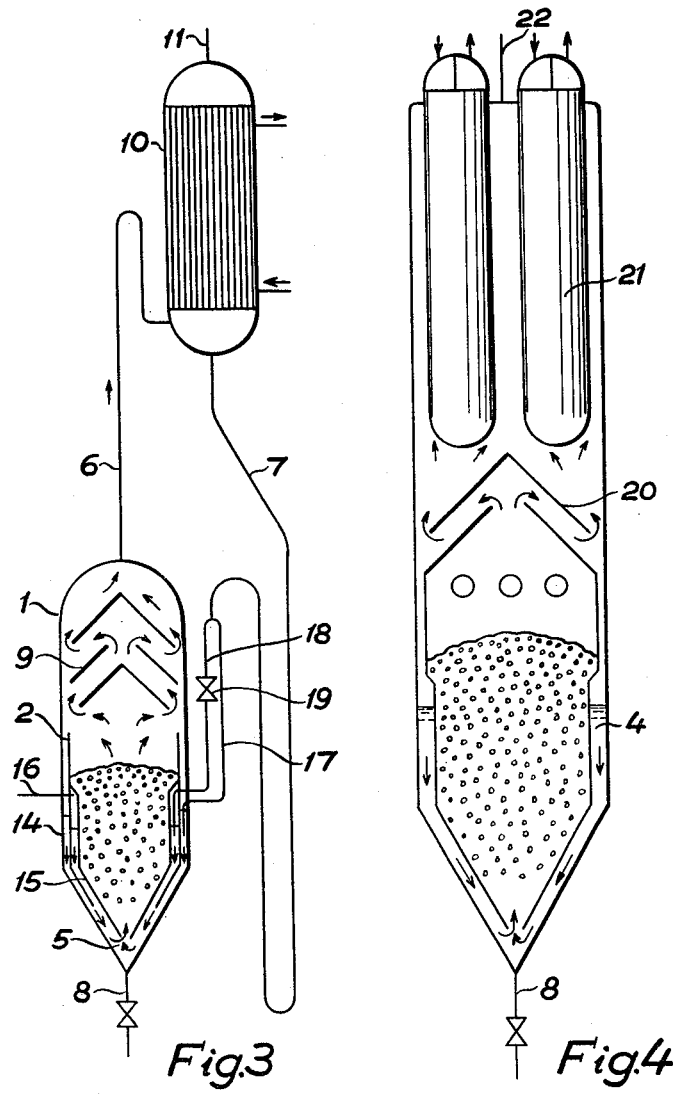

3,166,480
HOMOGENEOUS BOILING REACTOR
Olle Lindström, Vasteras, Sweden, assignor to Allmänna Svenska Elektriska Aktiebolaget, Vasteras, Sweden, a Swedish corporation
Filed Nov. 28, 1960, Ser. No. 72,204
Claims priority, application Sweden, Dec. 1, 1959, 11,291/59
3 Claims. (Cl. 176—47)

Homogeneous boiling reactors show great advantages compared with homogeneous reactors in which the liquid fuel circulates through heat exchangers. These advantages are primarily: absence of circulation pumps; the radio-active solution or dispersion is completely contained in the reactor vessel and associated equipment for fuel preparation and does not come into contact with the heat exchange surfaces; higher temperature for the turbine steam compared with a reactor system having a circulating fuel operating at the same pressure.

These advantages, above all those connected with the question of safety, are so important that the homogeneous boiling reactors must be deemed very promising for future power reactors. The success gained by heterogeneous boiling reactors may also be taken as a positive indication for the corresponding homogeneous reactors, in spite of the fact that the conditions differ partly.

Calculations and experiments have shown that the specific power for a homogeneous boiling reactor is of the same magnitude as a homogeneous reactor having a circulating fluid, if the liquid volume which in the latter case is present in the outer circuits is taken into account.

Proposals for boiling reactors to a great extent follow the same basic principles as for circulating systems. Thus, possibilities exist for both one and two zone boiling reactors. One zone can be boiling and the other non-boiling. The simplest system is the one zone boiling reactor using solution fuel. However, it is suspected, as a result of laboratory experiments, that prevailing fuel solutions based on enriched uranium sulphate in light or heavy water might cause certain problems in boiling reactors because of reduction and precipitation of uranium compounds in contact with stainless steel under the oxygen deficient conditions existing in the boiling fuel solution.

The present invention relates mainly to boiling dispersion reactors such as those mentioned above, but is also suitable for boiling reactors containing solution fuel. The invention relates to a reactor in which a two zone distribution is maintained within the pressure vessel, in which the outer zone preferably acts as reflector while the inner zone contains a dispersion or solution of fissile and fertile material.

The invention is characterised in that the reactor comprises a pressure vessel, an upwardly open inner container which contains the boiling fuel and is arranged substantially within the lower portion and in spaced relationship to the pressure vessel, a reflector chamber formed by the pressure vessel and the inner container for receiving the condensate of the boiling fuel vapor condensed in heat exchanger means, and a pressure equalizing space above and communicating with both the inner container and the reflector chamber, wherein the levels of the boiling fuel in the inner container and of the condensate in the reflector chamber are normally below the upper opening of the inner container, means for leading the condensate through said plenum into the reflector chamber and means for returning the condensate from said reflector chamber to the inner container.

Some embodiments of the invention are shown schematically in FIGURES 1–4 of the accompanying drawings.

As an example, a boiling heavy water reactor is chosen in the following description, having a core zone containing a dispersion of thorium oxide and enriched uranium oxide, which zone is surrounded by a heavy water reflector. This example is merely to illustrate the principle of the invention and FIGURE 1 is entirely schematical. In the pressure vessel 1 of the reactor an inner container 2 is arranged which is open at its lower end 5 so that a free connection between the core zone 3 and the reflector zone 4 is obtained. The upper part of the container is open so that a free connection between the core zone and the reflector zone is brought about in the vapour phase for equalization of the pressure and also with respect to certain safety aspects which will be mentioned hereinafter. The upper connection between the two zones should in this case be above the level at which the liquid surface in the core zone normally lies during operation of the reactor. The walls of the container 2 must be pervious to neutrons and are suitably made of zirconium alloy. It is also possible, however, to make the partition walls of thin sheets of stainless steel. The walls of the container should not take up mechanical stresses, but serve only to keep the two reaction zones separated.

The liquid in the core zone 3 is boiling, while the liquid in the surrounding zone is not boiling, or boils only to a small extent. The steam from the core zone passes the entrainment separator 9 and is led through the steam conduit 6 to the heat exchanger 10 from which the condensate is returned through the pipes 7. The permanent gas remaining flows from the heat exchanger via a conduit 11 to a system for re-combining oxyhydrogen gas and for waste disposal. The pipes 7 distribute the condensate first to the reflector zone 4, from where the condensate is then led back to the core zone 3 through the lower end 5 of the container 2. The opening of the container 2 may consist of several smaller holes or slots in order to give a better distribution of the condensate when it is reintroduced into the core zone 3. The quantity of condensate transported in this way through the reflector zone is very large and consequently back mixing with the liquid fuel being flushed back into the blanket zone does not normally take place since the reflector zone is continuously purged with the condensate.

A connection 8 at the bottom of the reactor vessel 1 connects the reactor system with a dump tank and a pressurizer, not shown in the figure.

Of course, special steps must be taken with regard to fuel dispersions to prevent sedimentation of the dispersed material in the pipe system. This creates no difficulties in the core zone since the great turbulence during boiling is quite sufficient to maintain a homogeneous distribution of the dispersed material in the core zone. Sedimentation in the connection pipe 8 is avoided by means of gas bubbling and/or re-introducing a part of the condensate from the heat exchanger.

FIGURE 2 shows an alternative embodiment of the connection between the inner container 2 and the reflector zone 4. A duct 12 connects the reflector zone with the core zone. A valve 13 is arranged in this duct. By appropriately setting the flow resistance in this valve, the reflector level is brought to the desired height.

Certain advantages are gained from the point of view of regulation by dividing, according to FIGURE 3, the reflector zone into two parts, a free reflector zone 14, the pressure over the free liquid surface of which is the same as over the free liquid surface in the core zone, and a reflector chamber 15 over the liquid surface of which the gas pressure can be adjusted to a suitable level by a control means (not shown) via the duct 16. In this way the level in the reflector chamber 15 is regulated by a separate pressurizing system. The condensate from the condensate conduit 7 is divided into two flows 17 and 18 which carry the condensate to the free reflector zone 14 and the reflector chamber 15 respectively. A control valve 19 regulates the distribution of the condensate in these two branch conduits.

FIGURE 4 shows an alternative embodiment wherein the complete primary system is arranged within the pressure vessel. The steam from the core zone is led against a conical screen 20 which acts as entrainment separator but also prevents the condensate being returned to the core zone direct from the heat exchanger. Heat exchanger tubes 21 are suspended in the lid of the pressure vessel 1. From these tube bundles the condensate runs down onto the upper side of the screen 20 and is led into the blanket zone 4.

Of course, the carrying of the condensate from the heat exchanger tubes into the reflector chamber, can be achieved with devices other than those indicated in the figure. In other aspects, conventional technique is made use of for operating this reactor. Thus the connection 22 is connected to a pressurizing system and waste disposal system. The pipe 3 is, as before, connected to a dump tank and pressurizer, neither of which is shown in the figure.

Homogeneous nuclear reactors, and more particularly, boiling homogeneous reactors are characterised by great operational safety because of the negative temperature coefficient for the reactivity. The present invention enables a further increase in the operational safety. If the liquid in the nuclear zone boils too violently, it boils over and is carried to the protection zone, thus greatly reducing the reactivity and so providing a very important safety factor.

The precipitation problem with solution fuels based on uranium sulphate in heavy or light water, as touched upon above, is also overcome in reactors constructed according to the present invention. The fuel solution is enclosed in the core zone and therefore comes into contact only with the wall of the container 2. This wall can be made of titanium or zirconium so that the risk of precipitation is eliminated.

In addition to the above stated advantages, of course, the most important advantage is that a two-zone distribution is produced in a very simple manner, whereby the outer zone is used as reflector. This brings about an improvement in neutron economy in comparison with corresponding one-zone concept, which can ensure breeding in dispersion reactors based on the thorium-uranium 233 cycle. Thanks to the improved neutron economy the demands on the fuel reprocessing plant become lower and larger amounts of neutron poisons can be tolerated in the fuel solution.

The circulation pattern with the heavy water condensate flowing from the reflector zone into the core zone at the lower end of the reactor vessel, is also advantageous from the point of view that sedimentation at the bottom of the reactor vessel is prevented.

The simple partition wall of course presents great advantages from the points of view of construction and maintenance. The partition wall can be more easily replaced than in other constructions with zones completely separated from each other.

Amongst other advantages already mentioned in the description it should be particularly emphasized that the pressure balancing system is eliminated.

The possibility of boiling over from the nuclear zone to the reflector zone is very important from the point of view of safety.

I claim:
1. A boiling homogeneous nuclear reactor comprising a pressure vessel, an inner container having an upper opening and containing fuel comprising a fissile material and a liquid selected from the group consisting of light and heavy water and standing at a level in the inner container, from the water of which steam is evaporated during boiling while the fissile material remains in the inner container, the container being arranged substantially within the lower portion of and in spaced relationship to the pressure vessel, the pressure vessel and the inner container forming between them a reflector chamber for receiving the condensate of the evaporated water, said vessel and said inner container defining above said inner container a pressure equalizing space, the space being in communication with both the inner container and the reflector chamber, condensing means connected with said space for condensing evaporated water, the level of the fuel in the inner container and of the condensate in the reflector chamber being below the upper opening of the inner container, means for leading the condensate from the condensing means into the reflector chamber, and means adjacent to the bottom of the inner container for the return of condensate from said reflector chamber to the inner container.

2. A boiling homogeneous reactor as claimed in claim 1, in which the means for the return of condensate to the inner container includes means for adjusting the level of the condensate in the reflector chamber.

3. A boiling homogeneous nuclear reactor comprising a pressure vessel, an upwardly open inner container containing fuel having a liquid selected from the group consisting of light and heavy water incorporated therein, from which water steam is evaporated during boiling, the container being arranged substantially within the lower portion of and in spaced relationship to the pressure vessel, means forming in the space between the pressure vessel and the inner container a first reflector chamber and a co-axial downwardly open and upwardly closed second reflector chamber, heat exchanger means, means to conduct vaporized water from said inner container to said heat exchanger means, connection means from said heat exchanger means to said chambers for introducing into the chambers the condensate of the vaporized water, means for controlling the distribution of the said condensate between the two chambers, means for adjusting the level of the condensate in the second chamber, means adjacent to the bottom of the pressure vessel for the return of condensate from said reflector chambers to the inner container, the upper portion of the pressure vessel defining above said inner container a space therein communicating with the inner container and the first reflector chamber.

References Cited by the Examiner
UNITED STATES PATENTS

| 2,946,732 | 7/60 | Wootton | 176—31 |
| 2,961,393 | 11/60 | Monson | 176—18 |
| 3,046,212 | 7/62 | Anderson | 176—45 |
| 3,074,874 | 1/63 | Grenon et al. | 176—47 |

OTHER REFERENCES

Directory of Nuclear Reactors, vol. 2, pp. 215–222, published by International Atomic Energy Agency.

"Preliminary Design of a Boiling Slurry Reactor Experiment," AEC Document, ANL–6148, April 1960, pp. 29–30.

CARL D. QUARFORTH, *Primary Examiner.*
REUBEN EPSTEIN, *Examiner.*